(12) United States Patent
Liao

(10) Patent No.: US 11,771,215 B2
(45) Date of Patent: Oct. 3, 2023

(54) ELECTRIC TOOTHBRUSH WITH ASSEMBLY FOR DETECTING PRESSURE AGAINST BRUSH HEAD

(71) Applicant: SHENZHEN RUIHU TECHNOLOGY CO., LTD., Guangdong (CN)

(72) Inventor: Guangrui Liao, Guangdong (CN)

(73) Assignee: SHENZHEN RUIHU TECHNOLOGY CO., LTD., Shenzhen (CN)

( * ) Notice: Subject to any disclaimer, the term of this patent is extended or adjusted under 35 U.S.C. 154(b) by 617 days.

(21) Appl. No.: 16/906,196

(22) Filed: Jun. 19, 2020

(65) Prior Publication Data

US 2020/0315757 A1 Oct. 8, 2020

Related U.S. Application Data

(63) Continuation of application No. PCT/CN2018/075209, filed on Feb. 5, 2018.

(30) Foreign Application Priority Data

Dec. 21, 2017 (CN) .......................... 201711392243.4
Jan. 17, 2018 (CN) .......................... 201810046052.0

(51) Int. Cl.
*A46B 15/00* (2006.01)
*G01L 5/00* (2006.01)
(Continued)

(52) U.S. Cl.
CPC ...... *A46B 15/0012* (2013.01); *A46B 15/0006* (2013.01); *A61C 17/32* (2013.01);
(Continued)

(58) Field of Classification Search
CPC ......... A46B 15/0012; A46B 9/04; G01L 5/00; A61C 17/32; A61C 17/34
See application file for complete search history.

(56) References Cited

U.S. PATENT DOCUMENTS 4,716,614 A * 1/1988 Jones ........................ G01L 5/00
15/176.1
5,815,872 A * 10/1998 Meginniss, III ..... A61C 17/222
15/105
(Continued)

FOREIGN PATENT DOCUMENTS

| CN | 102967396 A | 3/2013 |
| CN | 104619211 A | 5/2015 |

(Continued)

OTHER PUBLICATIONS

International Search Report of PCT Patent Application No. PCT/CN2018/075209 dated Aug. 30, 2018.

*Primary Examiner* — Laura C Guidotti

(57) ABSTRACT

Disclosed is an electric toothbrush, comprising: a handle; a drive element provided in the handle, an output shaft of the drive element extending out of the handle; a brush head disposed at one end of the output shaft remote from the handle and connected to the output shaft; and a stress triggering element and a stress detecting element, which are oppositely provided on surfaces of the output shaft; wherein the stress triggering element is configured for producing stress concentration at the position where the stress triggering element is located when the output shaft motions; and the stress detecting element is configured for detecting the stress at the position where the stress triggering element is located, thereby obtaining a pressure corresponding to the stress, the electric toothbrush as provided offers a simple structure for pressure detection.

12 Claims, 3 Drawing Sheets

(51) Int. Cl.
*A61C 17/32* (2006.01)
*A46B 13/02* (2006.01)
*A61C 17/22* (2006.01)
*A61C 17/26* (2006.01)

(52) U.S. Cl.
CPC ............... G01L 5/00 (2013.01); *A46B 13/02* (2013.01); *A61C 17/22* (2013.01); *A61C 17/221* (2013.01); *A61C 17/26* (2013.01)

(56) References Cited

U.S. PATENT DOCUMENTS

| | | | |
|---|---|---|---|
| 7,104,144 B1 * | 9/2006 | Hsieh | B25B 13/08 |
| | | | 73/862.21 |
| 7,380,472 B2 * | 6/2008 | Hsieh | B25B 23/1425 |
| | | | 73/862.24 |
| 10,842,397 B2 * | 11/2020 | Liu | G01B 7/20 |

FOREIGN PATENT DOCUMENTS

| | | |
|---|---|---|
| CN | 106546162 A | 3/2017 |
| JP | H05329024 A | 12/1993 |

* cited by examiner

ELECTRIC TOOTHBRUSH WITH ASSEMBLY FOR DETECTING PRESSURE AGAINST BRUSH HEAD

CROSS REFERENCE TO RELATED APPLICATIONS

The present application is a Continuation Application of PCT Application No. PCT/CN2018/075209 filed on Feb. 5, 2018, which claims the benefit of Chinese Patent Application Nos. 201810046052.0 filed on Jan. 17, 2018 and 201711392243.4 filed on Dec. 21, 2017. All the above are hereby incorporated by reference.

FIELD

Embodiments of the present disclosure relate to electrical household appliances, and more particularly relate to an electric toothbrush.

BACKGROUND

Electric toothbrushes have been increasingly embraced by consumers thanks to their good dental cleaning effect. An operation principle of the electric toothbrushes to clean teeth is leverage a linear motor to drive the brush head to vibrate back and force. However, a majority of brands of the electric toothbrushes currently available in the market are not equipped with a pressure detection function that may alarm a user from wearing out the teeth with excess force during his/her brushing process. The pressure detection function is only provided by a few high-end brands.

The PCT international patent application serial number CN104619211A discloses a force sensor providing continuous feedback for a resonant drive toothbrush using a Hall Sensor, which mainly uses a V-spring assembly to transmit force, wherein when the rear end of the V-spring assembly is displaced, the magnet produces a changing magnetic field, the Hall sensor outputs a signal to the processor, and the processor produces a signal indicating the pressure against the brush head in response to the output from the Hall sensor and the stored information and provides an indication when the pressure exceeds the threshold.

However, such an electric toothbrush has a relatively complex structure, which significantly increases its manufacturing cost. Moreover, the complex structure causes a relatively large size, making it inconvenient to carry.

SUMMARY

An electric toothbrush provided in the present disclosure comprises:
  a handle;
  a drive element provided in the handle, an output shaft of the drive element extending out of the handle;
  a brush head disposed at one end of the output shaft remote from the handle and connected to the output shaft;
  a stress triggering element and a stress detecting element, which are oppositely provided on surfaces of the output shaft;
  wherein the stress triggering element is configured for producing stress concentration at the position where the stress triggering element is located when the output shaft motions;
  the stress detecting element is configured for detecting the stress at the position where the stress triggering element is located, thereby obtaining a pressure corresponding to the stress.

In at least one embodiment, a first recess is provided on the surface of the output shaft, the first recess is configured as the stress triggering element, and the size of the first recess in the length direction of the output shaft has a predetermined value.

In at least one embodiment, the predetermined value is not more than 3 mm.

In at least one embodiment, the cross section of the first recess has a V-shape, an arc shape, or a rectangular shape.

In at least one embodiment, a second recess is further provided on the output shaft, the second recess being arranged opposite to the first recess, the stress detecting element being mounted in the second recess.

In at least one embodiment, a portion of the second recess in contact with the stress detecting element is configured as a horizontal plane.

In at least one embodiment, the stress detecting element comprises a stress sensor,
  the stress sensor comprising:
  a flexible substrate including a first surface and a second surface which are oppositely arranged in the thickness direction;
  an electrically conductive layer covering on top of the first surface and the second surface, the electrically conductive layer including a matrix and electrically conductive particles dispersed in the matrix;
  a covering film covering on top of the electrically conductive layer;
  electrodes disposed on end portions of the electrically conductive layer;
  wherein the electrically conductive particles include a first electrically conductive particle, the first electrically conductive particle including carbon powder or metal power; and/or
  the electrically conductive particles further include a second electrically conductive particle, the second electrically conductive particle including carbon fiber, nanotubes or graphene.

In at least one embodiment, the electrically conductive layer is configured as a Wheatstone bridge, bridge resistors of which include a surface mount resistor arranged on a PCB foundation plate;
  the stress sensor further comprises a signal amplifier circuit.

In at least one embodiment, the flexible substrate further comprises:
  a first mount portion which is mounted in the second recess, the electrically conductive layer and the covering film being sequentially arranged on both of a first surface of the first mount portion and the second surface of the flexible substrate;
  a second mount portion being configured to be mounted on the PCB foundation plate, the electrically conductive layer and the covering film being sequentially arranged on both of a first surface of the second mount portion and the second surface of the flexible substrate;
  a connection portion provided between the first mount portion and the second mount portion, two ends of the connection portion being respectively connected to the first mount portion and the second mount portion, the electrically conductive layer being provided on a first surface of the connection portion, and the covering film being provided on a second surface of the connection portion.

In at least one embodiment, notches are provided at both sides of the first mount portion and/or the connection portion in the width direction; and/or a reinforcing layer is provided at one side of the first mount portion in the thickness direction, the thickness of the reinforcing layer ranging from 0.1 mm to 0.3 mm.

With the stress triggering element and the stress detecting element which are oppositely provided on the surfaces of the output shaft, wherein the stress triggering element is configurable to produce stress concentration and the stress detecting element is configurable to detect the stress at the position where the stress triggering element is located so as to obtain a pressure value based on the stress, the electric toothbrush according to the present disclosure offers a simple structure for pressure detection, such that the manufacturing cost is reduced and the cost effectiveness of the electric toothbrush is improved. In addition, the stress triggering element as provided enables sensitive reflection of the stress concentration, such that accuracy of pressure detection is enhanced and user experience is effectively improved.

BRIEF DESCRIPTION OF THE DRAWINGS

The drawings provide further understanding of the present disclosure and thus are an integral part of the present disclosure, which, in conjunction with the detailed embodiments below, are intended to, rather than limiting, the present disclosure. In the drawings.

EXPLANATIONS OF THE REFERENCE NUMERALS

100: electric toothbrush;
110: handle;
121: output shaft;
121a: first recess;
121b: second recess;
130: brush head;
140: stress triggering element;
150: stress detecting element;
151: flexible substrate;
151a: first mount portion;
151e: reinforcing layer;
151f: first surface;
151g: second surface.

DETAILED DESCRIPTION OF EMBODIMENTS

Hereinafter, some embodiments of the present disclosure will be described in further detail in conjunction with the accompanying drawings. It is understood that the embodiments described herein are only for illustrating and explaining, not intended for limiting, the present disclosure.

Figure 1:
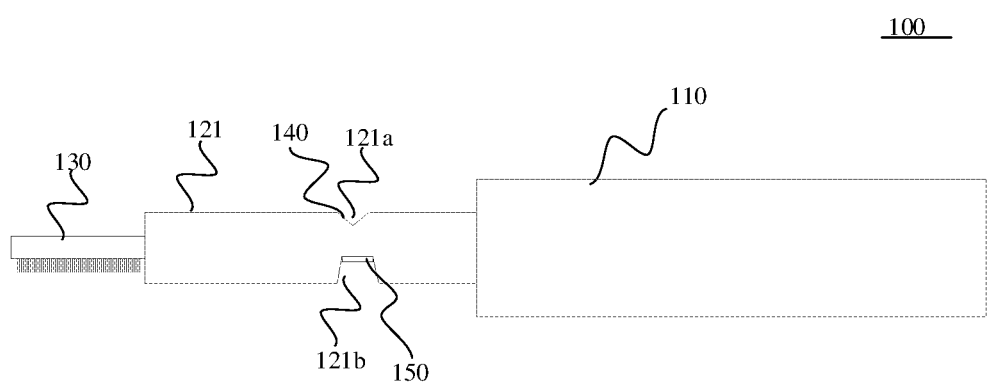
FIG. 1 is a structural schematic diagram of an electric toothbrush according to a first embodiment of the present disclosure.
Figure 2:
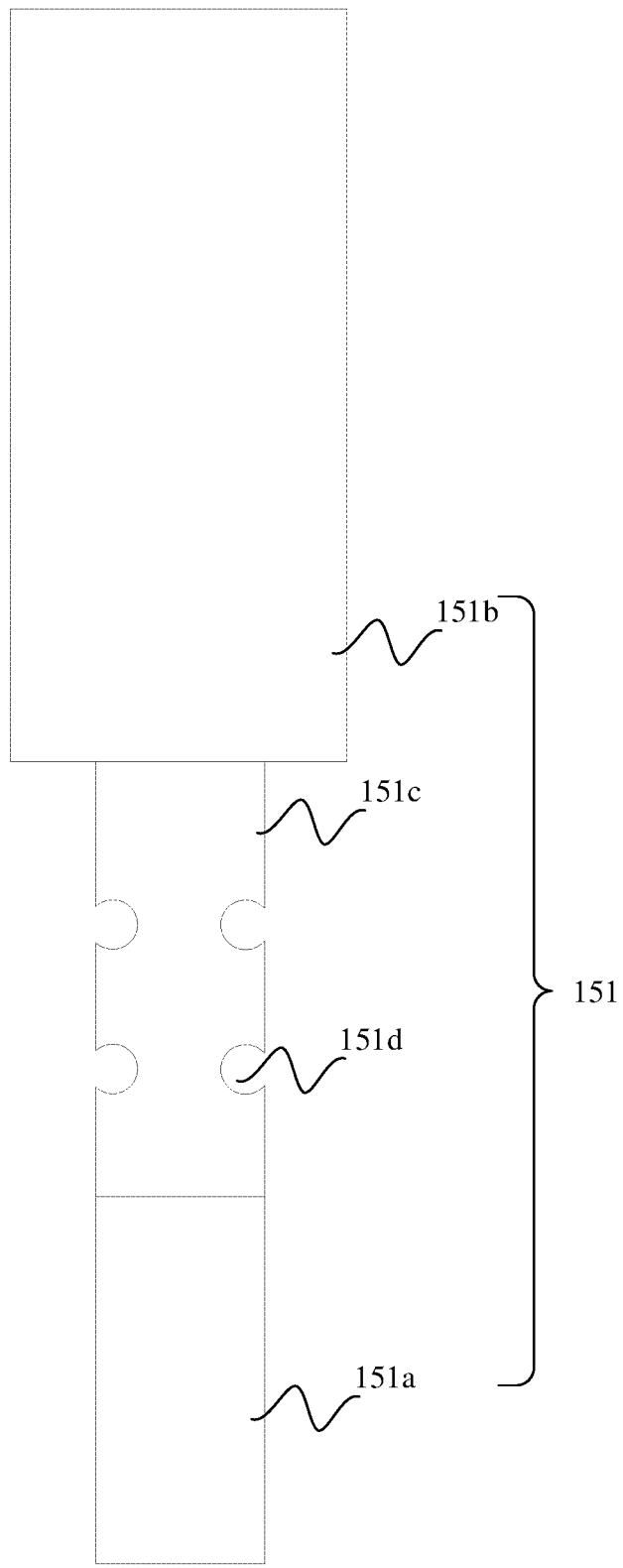
FIG. 2 is a structural schematic diagram of a stress detecting element according to a second embodiment of the present disclosure.
Figure 3:
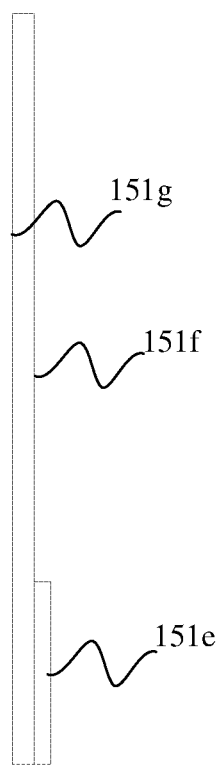
FIG. 3 is a side view of FIG. 2.

With reference to FIGS. 1, 2, and 3, an electric toothbrush 100 according to the present disclosure comprises a handle 110, a drive element (FIG. 1 only schematically illustrates the output shaft 121 portion of the drive element located outside the handle 110, wherein the main body of the drive element is generally provided in the handle 110), and a brush head 130. The drive element is provided in the handle 110 and extends out of the handle 110. The drive element, for example, is an electric motor, and in at least one embodiment, a linear motor. The brush head 130 is disposed at one end of the handle 110 remote from the output shaft 121 and connected to the output shaft 121.

The electric toothbrush 100 further comprises a stress triggering element 140 and a stress detecting element 150 which are oppositely provided on a surface of the output shaft 121. In other words, as shown in FIG. 1, the stress triggering element 140 is provided on top of the surface of the output shaft 121, and the stress detecting element 150 is provided on bottom of the surface of the output shaft 121.

The stress triggering element 140 is configured for producing stress concentration at the position where it is located when the output shaft 121 motions. In other words, the stress triggering element 140 has a structure for facilitating stress concentration. For example, the stress triggering element 140 assumes a structure such as a notch, a hole, a trench, etc.

The stress detecting element 150 is configured for detecting stress at the position where the stress triggering element 140 is located so as to obtain a pressure corresponding to the stress.

In at least some embodiments, when the electric toothbrush 100 adopts the structure provided in this exemplary embodiment, initial stress concentration occurs at the position where the stress triggering element 140 is located upon contact between the brush head 130 and the teeth; at this point, it is determined that the user is ready for brushing teeth; then, the drive element starts performing the tooth brushing action. In this way, sputtering of the paste on the brush head 130 may be avoided. Additionally, during the tooth brushing process, the stress at the position where the stress triggering element 140 is located is detected by the stress detecting element 150 and a pressure value is obtained based on the stress. In this way, the rotational speed of the drive element may be adjusted based on the obtained pressure value; in the case of excess force (i.e., the pressure value is relatively large), the rotational speed of the drive element will be slowed so as to effectively avoid wearing out and damaging the teeth under the high speed.

Therefore, with the stress triggering element 140 and the stress detecting element 150 which are oppositely provided on surfaces of the output shaft 121, wherein the stress triggering element 140 is configurable to produce stress concentration, and the stress detecting element 150 is configurable to detect the stress at the position where the stress triggering element 140 is located and obtain a pressure value based on the stress, the electric toothbrush 100 with the structure provided in this exemplary embodiment has a simple structure for pressure detection, which reduces the manufacturing cost and increases the cost effectiveness of the electric toothbrush 100. In addition, the stress triggering element 140 as provided sensitively reflects stress concentration, thereby improving accuracy of pressure detection and effectively ameliorating user experience.

In at least one embodiment, as shown in FIG. 1, a first recess 121a is provided on the surface of the output shaft 121, wherein the first recess 121a is configured as the stress triggering element 140, and the size of the first recess 121a in the length direction of the output shaft 121 has a predetermined value.

In other words, this embodiment provides an exemplary structure of the stress triggering element 140 for the electric toothbrush 100, wherein the first recess 121*a* as provided is inclined to produce stress concentration. Additionally, the size of the first recess 121*a* in the length direction of the output shaft 121 satisfies a predetermined value; otherwise, stress concentration can hardly be produced at the position where the first recess 121*a* is provided, such that the pressure detected by the stress detecting element 150 is not high enough, and consequently, the obtained pressure is not large enough and the sensitivity is not enough either.

Note that the predetermined value may be established dependent on actual needs, which is not limited here.

For the electric toothbrush 100 with the structure described in this exemplary embodiment, by providing the first recess 121*a* on the surface of the output shaft 121 and configuring the first recess 121*a* as the stress triggering element 140, the structure of the stress triggering element 140 is simplified, which further reduces the manufacturing cost of the electric toothbrush 100 and increases the cost effectiveness of the electric toothbrush 100. In addition, as the first recess 121*a* provided has a predetermined size, the stress concentration is sensitively reflected, which thus improves accuracy of pressure detection and effectively ameliorates user experience.

The Inventors found through repeated theoretical experiments that the predetermined value is preferably not more than 3 mm.

Therefore, when the size of the first recess 121*a* in the length direction of the output shaft 121 is not more than 3 mm, the stress concentration is reflected more sensitively, which improves accuracy of pressure detection and effectively ameliorates user experience.

In at least one embodiment, as shown in FIG. 1, the cross section of the first recess 121*a* has any one of a V-shape, an arc shape, or a rectangular shape.

In at least one embodiment, as shown in FIG. 1, a second recess 121*b* is further provided on the output shaft 121; the second recess 121*b* and the first recess 121*a* are oppositely provided; as shown in FIG. 1, the first recess 121*a* is disposed on the top of the output shaft 121; correspondingly, the second recess 121*b* is disposed at the bottom of the output shaft 121. The stress detecting element 150 is mounted in the second recess 121*b*.

For the electric toothbrush 100 with the structure described in this exemplary embodiment, by providing a second recess 121*b* on the surface of the output shaft 121 and configuring the second recess 121*b* for mounting the stress detecting element 150, the stress detecting element 150 becomes easy to mount, which further reduces the manufacturing cost of the electric toothbrush 100 and increases the cost effectiveness of the electric toothbrush 100. In addition, because the first recess 121*a* and the second recess 121*b* are oppositely provided, the stress detecting element 150 provided within the second recess 121*b* is enabled to accurately detect the stress produced in the first recess 121*a*, which improves accuracy of pressure detection and thus effectively ameliorates user experience.

In at least one embodiment, as shown in FIG. 1, a portion of the second recess 121*b* in contact with the stress detecting element 150 is configured as a horizontal plane.

In other words, as shown in FIG. 1, the top position (i.e., mounting plane) of the second recess 121*b* is configured as a horizontal plane. In this way, in order to mount the stress detecting element 150 into the second recess 121*b*, silicone rubber is generally applied to bond the stress detecting element 150 into the second recess 121*b*; as the portion of the second recess 121*b* in contact with the stress detecting element 150 is configured as a horizontal plane, the contact area between the stress detecting element 150 and the second recess 121*b* is enlarged, such that the stress detecting element 150 is mounted more securely in the second recess 121*b*.

In at least one embodiment, the stress detecting element 150 comprises a stress sensor, an exemplary structure of which refers to the PCT patent application PCT/CN2017/114852 filed by same Applicant. In that patent application, the stress sensor comprises a flexible substrate 151, an electrically conductive layer (not shown), a covering film (not shown), and electrodes, wherein the flexible substrate 151 includes a first surface 151*f* and a second surface 151*g* which are oppositely arranged in the thickness direction; the electrically conductive layer covers on top of the first surface 151*f* and the second surface 151*g*. Moreover, the electrically conductive layer comprises a matrix (not shown) and electrically conductive particles (not shown) dispersed in the matrix. The covering film covers on top of the electrically conductive layer so as to electrically insulate the electrically conductive layer from the ambience; the electrodes are disposed at end portions of the electrically conductive layer.

In one embodiment, the electrically conductive particles include a first electrically conductive particle, the first electrically conductive particle including carbon powder or metal power; and/or
the electrically conductive particles further include a second electrically conductive particle, the second electrically conductive particle including carbon fiber, nanotubes or graphene.

For the electric toothbrush 100 with the structure described in this exemplary embodiment, the stress detecting element 150 is a stress sensor, the stress sensor comprising inter alia a flexible substrate 151, an electrically conductive layer, and a covering film, wherein the electrically conductive particles in the electrically conductive layer include a first electrically conductive particle, the first electrically conductive particle including carbon powder or metal power; and/or the electrically conductive particles further include a second electrically conductive particle, the second electrically conductive particle including carbon fiber, nanotubes or graphene. In this way, the sensitivity of the stress sensor is significantly enhanced, such that the electric toothbrush 100 of this structure is sensitive in stress detection and is enabled to further detect the stress corresponding to the stress concentration; as such, the accuracy of pressure detection is improved and user experience is effectively ameliorated.

To further improve sensitivity of the stress sensor, accuracy of pressure detection, and thus effectively ameliorate user experience, in at least one embodiment, the electrically conductive layer is configured as a Wheatstone bridge, bridge resistors of which include a surface mount resistor arranged on a PCB foundation plate;

The stress sensor further comprises a signal amplifier circuit.

In at least one embodiment, as illustrated in FIGS. 2 and 3, the flexible substrate 151 further comprises:
  a first mount portion 151*a* which is mounted in the second recess 121*b*, the electrically conductive layer and the covering film being sequentially arranged on two surfaces (i.e. corresponding to a first surface 151*f* and a second surface 151*g* of the flexible substrate 151) of the first mount portion 151*a* in the thickness direction;

a second mount portion 151b which is mounted on the PCB foundation plate (not shown), the electrically conductive layer and the covering film being sequentially arranged on two surfaces (i.e., also corresponding to the first surface 151f and the second surface 151g of the flexible substrate 151) of the second mount portion 151b in the thickness direction;

a connection portion 151c provided between the first mount portion 151a and the second mount portion 151b, two ends of the connection portion 151c being respectively connected to the first mount portion 151a and the second mount portion 151b, wherein the electrically conductive layer is provided on one surface (e.g., corresponding to the first surface 151f of the flexible substrate 151) of the connection portion 151c in the thickness direction (the direction perpendicular to the paper surface in FIG. 2), and the covering film is provided on the other surface (corresponding to the second surface 151g of the flexible substrate 151) of the connection portion 151c.

The output shaft 121 of the drive element (generally a linear motor) twists back and forth with a very small angle when the drive element is operating, the stress sensor mounted on the output shaft is also in motion. The second mount portion 151b of the stress sensor is welded on the stationary PCB foundation plate. The first mount portion 151a is mounted in the second recess 121b. To avoid repetitive twisting of the stress sensor during long-term use, which would otherwise cause rupture to the flexible substrate 151, and also to facilitate bending of the flexible substrate 151, the middle area of the flexible substrate 151 is ingeniously thinned, i.e., the two surfaces of the connection portion 151c therebetween in the thickness direction are only configured with a single-layer structure. As such, the service life of the stress sensor is improved, the manufacturing cost of the electric toothbrush 100 is further reduced, and the cost effectiveness of the electric toothbrush 100 is improved.

In at least one embodiment, as shown in FIG. 2, notches 151d are provided at two sides of the first mount portion 151a and/or the notches 151d are provided at two sides of the connection portion 151c in the width direction (e.g., the left-right direction illustrated in FIG. 2).

In one embodiment, four notches 151d are provided at two sides of the connection portion 151c in the width direction; of course, other numbers of notches 151d are also allowed; and the notches 151d may be configured to have an arc or another shape. This avoids fracturing of the flexible substrate 151. As such, the service life of the stress sensor is improved, the manufacturing cost of the electric toothbrush 100 is further reduced, and the cost effectiveness of the electric toothbrush 100 is improved.

In at least some embodiment, as shown in FIG. 3, a reinforcing layer 151e is provided at one side of the first mount portion 151a in the thickness direction, the thickness of the reinforcing layer 151e ranging from 0.1 mm to 0.3 mm.

In one embodiment, the reinforcing layer 151e is provided at one side of the first mount portion 151a of the flexible substrate 151 in the thickness direction. The reinforcing layer 151e, for example, is selected from a group consisting of a steel plate, a PT material layer, etc., which, of course, optionally has another structure. In one embodiment, a steel plate of around 0.1 mm is provided at the position where the first mount portion 151a of the flexible substrate 151 is located, but there is no reinforcing layer in other portions of the flexible substrate 151.

Therefore, the service life of the stress sensor is improved, the manufacturing cost of the electric toothbrush 100 is further reduced, and the cost effectiveness of the electric toothbrush 100 is improved.

It may be understood that the embodiments above are only exemplary embodiments adopted for illustrating the principle of the present disclosure; however, the present disclosure is not limited thereto. To those of normal skill in the art, various alternations and improvements may be made without departing from the spirit and essence of the present disclosure, and such alternations and improvements are deemed as falling into the protection scope of the present disclosure.

I claim:

1. An electric toothbrush, comprising:
a handle;
a drive element provided in the handle, an output shaft of the drive element extending out of the handle;
a brush head disposed at one end of the output shaft remote from the handle and connected to the output shaft;
a stress triggering element and a stress detecting element, which are oppositely provided on surfaces of the output shaft;
wherein the stress triggering element is configured for producing stress concentration at a position where the stress triggering element is located when the output shaft motions; and
the stress detecting element is configured for detecting the stress at the position where the stress triggering element is located, thereby obtaining a pressure corresponding to the stress,
wherein a first recess is provided on a surface of the output shaft, the first recess is configured as the stress triggering element, and a size of the first recess in a length direction of the output shaft has a predetermined value;
wherein a second recess is further provided on the output shaft, the second recess being arranged opposite to the first recess, the stress detecting element being mounted in the second recess;
wherein the stress detecting element comprises a stress sensor,
the stress sensor comprising:
a flexible substrate including a first surface and a second surface which are oppositely arranged in a thickness direction;
an electrically conductive layer covering on top of the first surface and the second surface, the electrically conductive layer including a matrix and electrically conductive particles dispersed in the matrix;
a covering film covering on top of the electrically conductive layer;
electrodes disposed on end portions of the electrically conductive layer;
wherein the flexible substrate further comprises:
a first mount portion which is mounted in the second recess, the electrically conductive layer and the covering film being sequentially arranged on both of a first surface of the first mount portion and the second surface of the flexible substrate;
a second mount portion configured to be mounted on a PCB foundation plate, the electrically conductive layer and the covering film being sequentially arranged on both of a first surface of the second mount portion and the second surface of the flexible substrate; and a connection portion provided between the first mount portion and the second mount portion, two ends of the connection portion being respectively connected to the first mount portion and the second mount portion, the electrically conductive layer being provided on a first surface of the connection portion, and the covering film being provided on a second surface of the connection portion.

2. The electric toothbrush according to claim 1, wherein the predetermined value is not more than 3 mm.

3. The electric toothbrush according to claim 2,
wherein the electrically conductive particles include a first electrically conductive particle, the first electrically conductive particle including carbon powder or metal powder; and/or
the electrically conductive particles further include a second electrically conductive particle, the second electrically conductive particle including carbon fiber, nanotubes or graphene.

4. The electric toothbrush according to claim 3, wherein the electrically conductive layer is configured as a Wheatstone bridge, bridge resistors of which include a surface mount resistor arranged on the PCB foundation plate; and
the stress sensor further comprises a signal amplifier circuit.

5. The electric toothbrush according to claim 4, wherein a cross section of the first recess has a V-shape, an arc shape, or a rectangular shape.

6. The electric toothbrush according to claim 5,
wherein the electrically conductive particles include a first electrically conductive particle, the first electrically conductive particle including carbon powder or metal powder; and/or
the electrically conductive particles further include a second electrically conductive particle, the second electrically conductive particle including carbon fiber, nanotubes or graphene.

7. The electric toothbrush according to claim 6, wherein the electrically conductive layer is configured as a Wheatstone bridge, bridge resistors of which include a surface mount resistor arranged on the PCB foundation plate; and
the stress sensor further comprises a signal amplifier circuit.

8. The electric toothbrush according to claim 1, wherein a portion of the second recess in contact with the stress detecting element is configured as a horizontal plane.

9. The electric toothbrush according to claim 8,
wherein the electrically conductive particles include a first electrically conductive particle, the first electrically conductive particle including carbon powder or metal powder; and/or
the electrically conductive particles further include a second electrically conductive particle, the second electrically conductive particle including carbon fiber, nanotubes or graphene.

10. The electric toothbrush according to claim 1,
wherein the electrically conductive particles include a first electrically conductive particle, the first electrically conductive particle including carbon powder or metal powder; and/or
the electrically conductive particles further include a second electrically conductive particle, the second electrically conductive particle including carbon fiber, nanotubes or graphene.

11. The electric toothbrush according to claim 10, wherein the electrically conductive layer is configured as a Wheatstone bridge, bridge resistors of which include a surface mount resistor arranged on the PCB foundation plate; and
the stress sensor further comprises a signal amplifier circuit.

12. The electric toothbrush according to claim 1, wherein notches are provided at both sides of the first mount portion and the connection portion in a width direction; and a reinforcing layer is provided at one side of the first mount portion in a thickness direction, a thickness of the reinforcing layer ranging from 0.1 mm to 0.3 mm.

* * * * *